United States Patent
Schumacher et al.

(10) Patent No.: US 7,546,737 B2
(45) Date of Patent: Jun. 16, 2009

(54) SEGMENTED EFFUSION COOLED GAS TURBINE ENGINE COMBUSTOR

(75) Inventors: Jurgen C. Schumacher, Phoenix, AZ (US); Frank J. Zupanc, Phoenix, AZ (US); Rodolphe Dudebout, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 507 days.

(21) Appl. No.: 11/339,439

(22) Filed: Jan. 24, 2006

(65) Prior Publication Data

US 2007/0169484 A1    Jul. 26, 2007

(51) Int. Cl.
*F02C 3/04*    (2006.01)
(52) U.S. Cl. .................. 60/754; 60/756; 60/804
(58) Field of Classification Search ........... 60/752–760, 60/804
See application file for complete search history.

(56) References Cited

U.S. PATENT DOCUMENTS

| | | | |
|---|---|---|---|
| 2,576,046 A | 11/1951 | Scarth | |
| 3,420,058 A | 1/1969 | Howald et al. | |
| 4,687,436 A | 8/1987 | Shigeta | |
| 4,695,247 A | 9/1987 | Enzaki et al. | |
| 5,000,005 A * | 3/1991 | Kwan et al. | 60/757 |
| 5,233,828 A | 8/1993 | Napoli | |
| 5,241,827 A | 9/1993 | Lampes | |
| 5,261,223 A | 11/1993 | Foltz | |
| 5,307,637 A | 5/1994 | Stickles et al. | |
| 5,329,773 A | 7/1994 | Myers et al. | |
| 5,775,108 A | 7/1998 | Ansart et al. | |
| 6,145,319 A | 11/2000 | Burns et al. | |
| 6,210,152 B1 | 4/2001 | Haffner et al. | |
| 6,286,300 B1 | 9/2001 | Zelina et al. | |
| 6,408,629 B1 | 6/2002 | Harris et al. | |
| 6,427,446 B1 | 8/2002 | Kraft et al. | |
| 6,513,331 B1 | 2/2003 | Brown et al. | |
| 6,640,547 B2 | 11/2003 | Leahy, Jr. | |
| 6,655,149 B2 | 12/2003 | Farmer et al. | |
| 6,826,913 B2 | 12/2004 | Wright | |
| 6,868,675 B1 | 3/2005 | Kuhn et al. | |
| 6,955,053 B1 | 10/2005 | Chen et al. | |

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

A combustor includes two or more sets of effusion cooling holes that extend through the inner and outer liners. Each set of effusion cooling holes includes one or more initial rows of effusion cooling holes, one or more final rows of effusion cooling holes disposed downstream of the one or more initial rows, and a plurality of interposed rows of effusion cooling holes disposed between the initial and final rows. Each effusion cooling hole is disposed at a tangential angle relative to an axial line. The tangential angle of the effusion cooling holes in each set of effusion cooling holes gradually transitions from a substantially transverse tangential angle in each initial row to a substantially axial tangential angle in each final row.

20 Claims, 4 Drawing Sheets

SEGMENTED EFFUSION COOLED GAS TURBINE ENGINE COMBUSTOR

TECHNICAL FIELD

The present invention relates to gas turbine engines and, more particularly, to a gas turbine engine combustor effusion cooling mechanism that improves combustor cooling efficiency.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors, such as, for example, a high pressure compressor and a low pressure compressor. The compressed air from the compressor section then enters the combustor section, where a ring of fuel nozzles injects a steady stream of fuel into a plenum formed by combustor liners and a dome. The injected fuel is ignited in the combustor, which significantly increases the energy of the compressed air. The high-energy compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass plenum.

The combustors in gas turbine engines typically operate at relatively high temperatures (e.g., >3500° F.). Such high temperatures can adversely impact the service life of a combustor. Thus, some form of cooling is typically provided for the combustor. One example of combustor cooling is known as effusion cooling. Effusion cooling involves providing a matrix of relatively small diameter effusion cooling holes through the combustor liners, and into which a flow of cooling air is admitted. The effusion cooling holes are typically angled relative to a surface of the combustor. This angle increases the length of the effusion holes through the liners, which increases the surface area from which the cooling flow removes heat from the liner, and generates a cooling film on the inner wall of the liners.

Although effusion cooling is generally effective, it does suffer certain drawbacks. For example, one characteristic of effusion cooling is that the film effectiveness may be relatively low at or near upstream sections of the combustor liner. Moreover, the cooling film, once it is sufficiently established, may be interrupted by one or more rows of major combustor orifices, such as dilution holes. As a result, some form of cooling augmentation may be used in the upstream sections of effusion cooled combustor liners and/or at locations downstream of major combustor orifices. Such cooling augmentation can complicate the construction of combustor and increase overall size, weight, and/or costs.

Hence, there is a need for an effusion cooling configuration that eliminates, or at least reduces the likelihood of, the above-noted drawbacks. Namely, there is a need for an effusion cooling configuration that does not exhibit a relatively low film effectiveness at or near upstream sections of the combustor, and/or a configuration in which the cooling film that is established is not interrupted by one or more rows of major combustor orifices, and/or that does not rely on one or more forms of cooling augmentation. The present invention addresses one or more of these needs.

BRIEF SUMMARY

The present invention provides a combustor effusion cooling mechanism that improves combustor cooling efficiency. In one embodiment, and by way of example only, a gas turbine engine combustor includes an inner liner, an outer liner, a dome assembly, and two or more sets of effusion cooling holes. The inner liner has an inner surface, an outer surface, an upstream end, and a downstream end, and extends in an axial direction between the upstream and downstream ends. The outer liner extends in the axial direction and has an inner surface, an outer surface, an upstream end, and a downstream end. The outer liner is spaced apart from, and at least partially surrounds, the inner liner. The dome assembly is coupled between the upstream ends of the inner and outer annular liners to define a combustion chamber between the inner liner outer surface and the outer liner inner surface. The two or more sets of effusion cooling holes extend through the outer liner between the outer liner outer and inner surfaces. Each set of effusion cooling holes includes one or more initial rows of effusion cooling holes, one or more final rows of effusion cooling holes disposed downstream of the one or more initial rows, and a plurality of interposed rows of effusion cooling holes disposed between the initial and final rows. Each effusion cooling hole in the one or more initial rows is disposed at a tangential angle of between about 70° and about 90° relative to the axial direction. Each effusion cooling hole in the one or more final rows is disposed at a tangential angle of between about 0° and about 20° relative to the axial direction. Each effusion cooling hole in each of the interposed rows is disposed at a tangential angle, relative to the axial direction, that is less than the tangential angle of the effusion cooling holes in the one or more initial rows and greater than the tangential angle of the effusion cooling holes in the one or more final rows.

In another exemplary embodiment, a gas turbine engine combustor includes an inner liner, an outer liner, a dome assembly, two or more sets of effusion cooling holes extending through the inner liner between the inner liner outer and inner surfaces, and two or more sets of effusion cooling holes extending through the outer liner between the outer liner outer and inner surfaces. The inner liner has an inner surface, an outer surface, an upstream end, and a downstream end, and extends in an axial direction between the upstream and downstream ends. The outer liner extends in the axial direction and has an inner surface, an outer surface, an upstream end, and a downstream end. The outer liner is spaced apart from, and at least partially surrounds, the inner liner. The dome assembly is coupled between the upstream ends of the inner and outer annular liners to define a combustion chamber between the inner liner outer surface and the outer liner inner surface. Each set of effusion cooling holes in both the inner and outer liners includes one or more initial rows of effusion cooling holes, one or more final rows of effusion cooling holes disposed downstream of the one or more initial rows, and a plurality of interposed rows of effusion cooling holes disposed between the initial and final rows. Each effusion cooling hole in the one or more initial rows is disposed at a tangential angle of between about 70° and about 90° relative to the axial direction. Each effusion cooling hole in the one or more final rows is disposed at a tangential angle of between about 0° and about 20° relative to the axial direction. Each effusion cooling hole in each of the interposed rows is disposed at a tangential angle, relative to the axial direction, that is less than the tangential angle of the effusion cooling holes in the one or more initial rows and greater than the tangential angle of the effusion cooling holes in the one or more final rows.

In yet another exemplary embodiment, a gas turbine engine includes a compressor, a turbine, and a combustor with an effusion cooling mechanism that improves combustor cooling efficiency.

Other independent features and advantages of the preferred combustor and combustor effusion cooling mechanism will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, it will be appreciated that the described embodiment is not limited to use in conjunction with a particular type of turbine engine or with a particular type of combustor. Thus, although the present embodiment is, for convenience of explanation, depicted and described as being implemented in a multi-spool turbofan gas turbine jet engine, and with an annular combustor, it will be appreciated that it can be implemented in various other types of turbines, with other types of combustors, and in various other systems and environments.

Figure 1:
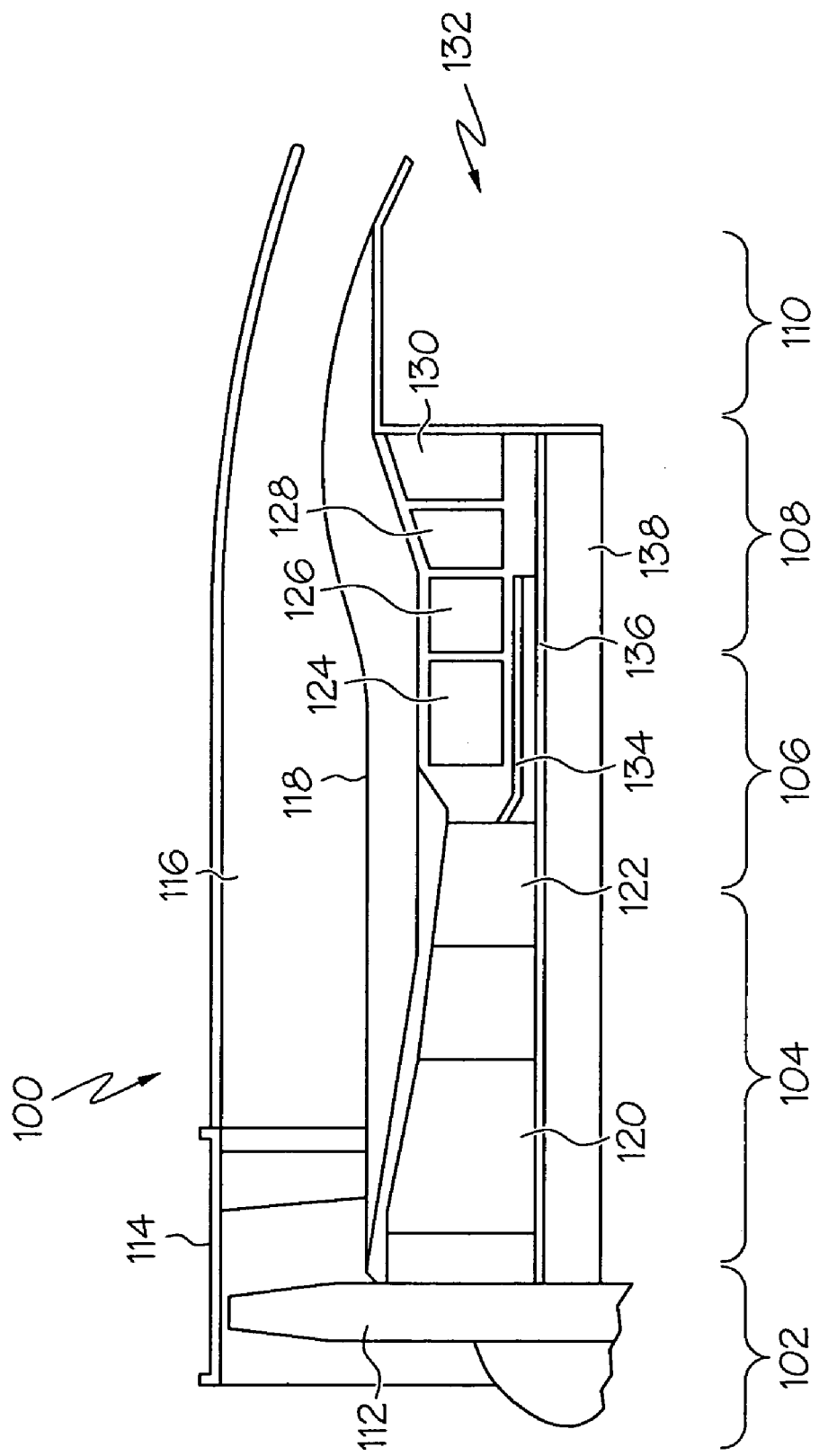
FIG. 1 is a simplified cross section side view of an exemplary multi-spool turbofan gas turbine jet engine according to an embodiment of the present invention.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106 the high pressure air is mixed with fuel and combusted in a combustor 124. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Figure 3:
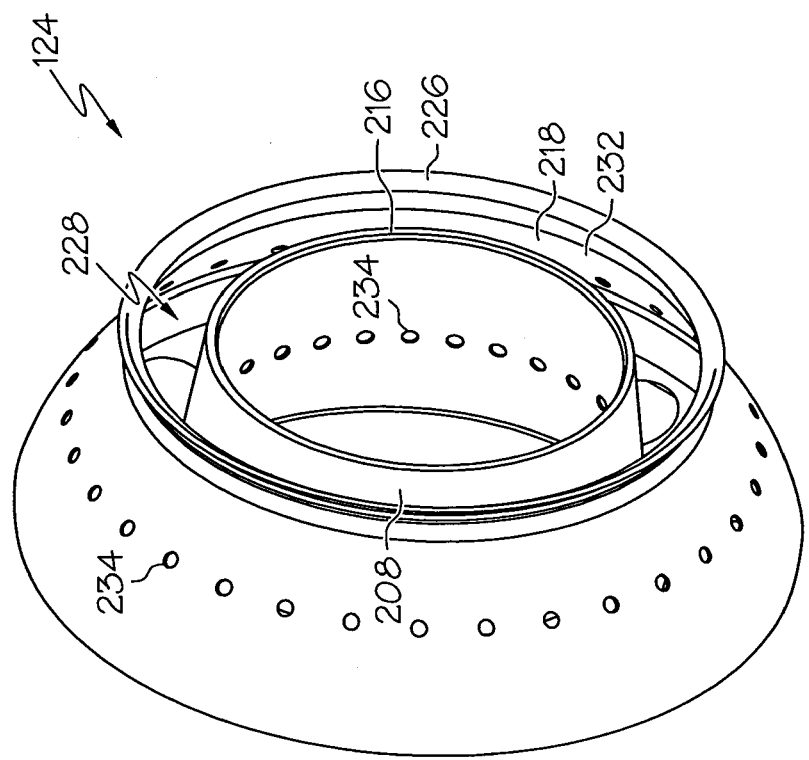
FIGS. 2 and 3 are perspective views of an exemplary combustor according to an embodiment of the present invention, from an upstream end and a downstream end, respectively, that may be used in the engine of FIG. 1.
Figure 2:
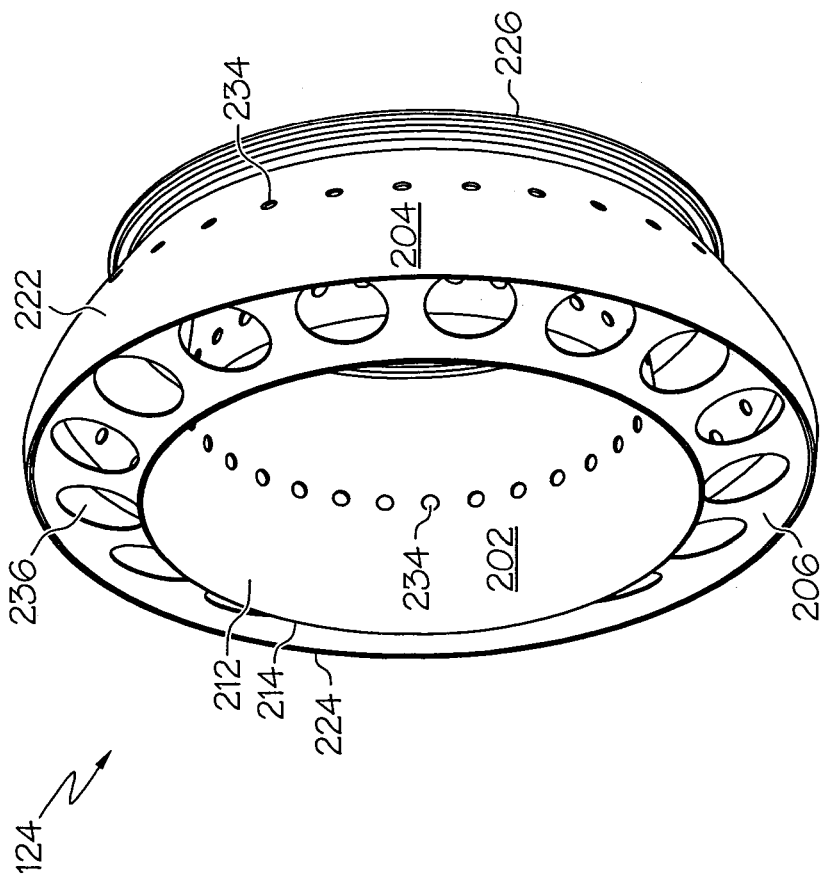

Turning now to FIGS. 2 and 3, it is seen that the combustor 124, which in the depicted embodiment is implemented as an annular combustor, includes an inner liner 202, an outer liner 204, and a dome 206. The inner liner 202 includes an inner surface 208, an outer surface 212, an upstream end 214, and a downstream end 216. Similarly, the outer liner 204, which at least partially surrounds the inner liner 202, includes an inner surface 218, an outer surface 222, an upstream end 224, and a downstream end 226. The dome 206 is coupled between the upstream ends 214 and 222 of the inner 202 and outer 204 liners, respectively, forming a combustion chamber 228 between the inner 202 and outer 204 liners. The downstream ends 216 and 226 of the inner 202 and outer 204 liners, respectively, form an opening 232 through which combusted air flows, and is directed into the turbine section 108.

In the depicted embodiment, the inner 202 and outer liners 204 each include a circumferential row of dilution openings 234. The dilution openings 234, as is generally known, admit additional air into the combustion chamber 228 to establish combustor aerodynamics and cool the exhaust gases to acceptable levels before entering the turbine section 108. Although only a single circumferential row of dilution openings 234 is depicted in FIGS. 2 and 3, it will be appreciated that the inner 202 and outer 204 liners could also be implemented with two or more circumferential rows of dilution openings 234. In general, if a combustor 124 is implemented with two or more circumferential rows of dilution openings 234, the upstream-most dilution openings 234 are referred to as primary dilution openings, and each subsequent downstream circumferential row of dilution openings 234 are referred to as secondary dilution openings.

The dome 206 also includes a plurality of openings. In particular, a plurality of circumferentially spaced, axially facing swirler assembly openings 236 are formed in the dome 206. Each of the swirler assembly openings 236 is configured to have mounted therein a non-illustrated swirler assembly. The non-illustrated swirler assemblies each receive compressed air from the compressor section 104 and fuel from a non-illustrated fuel tube. The fuel and air are swirled and mixed in the swirler assemblies, and the fuel/air mixture is then discharged into the combustion chamber 228 where it is ignited by one or more non-illustrated igniters.

Figure 4:
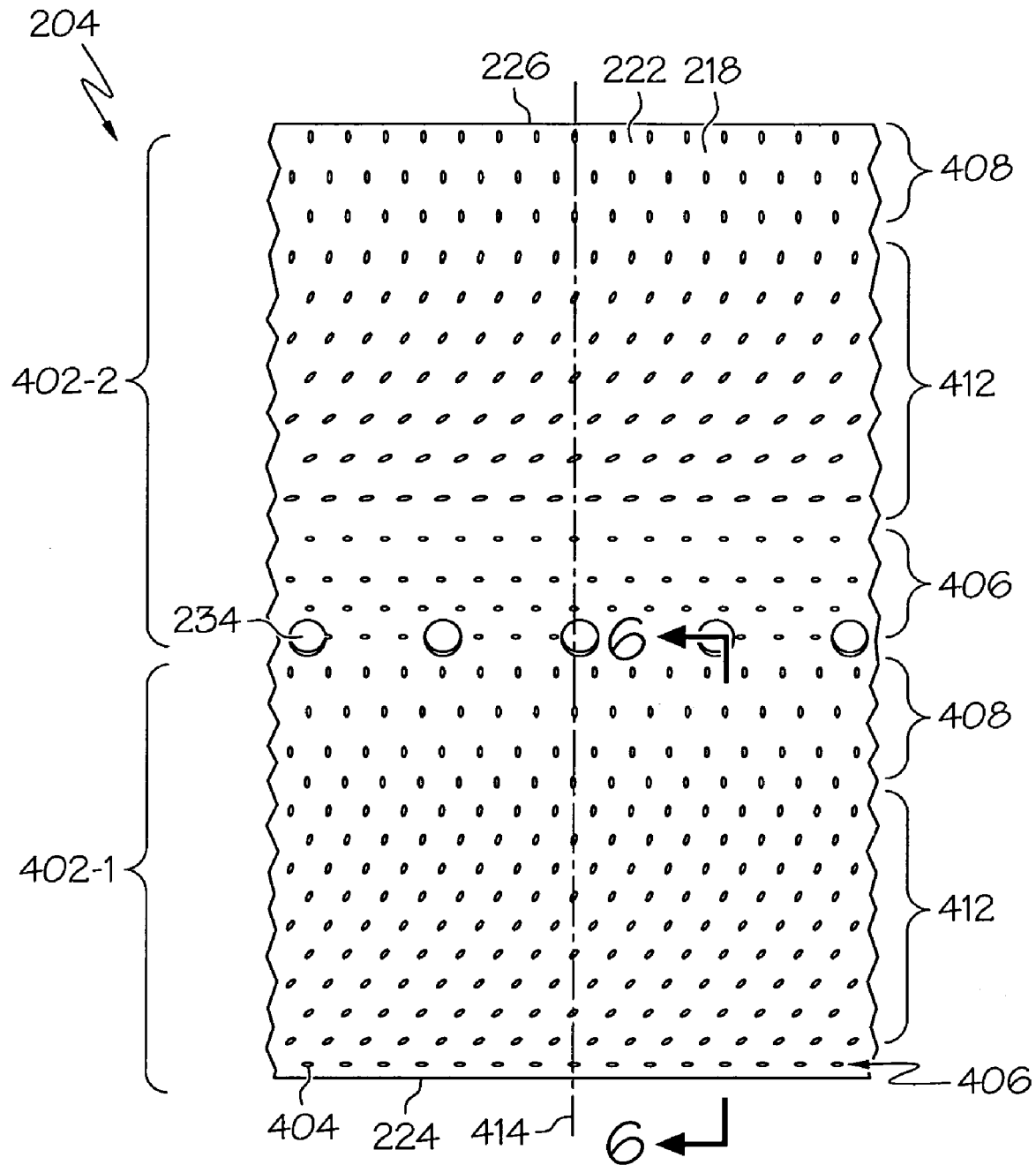
FIG. 4 is a top view of a portion of an exemplary combustor liner according to an embodiment of the present invention that may be used to implement the combustor shown in FIGS. 2 and 3.
Figure 5:
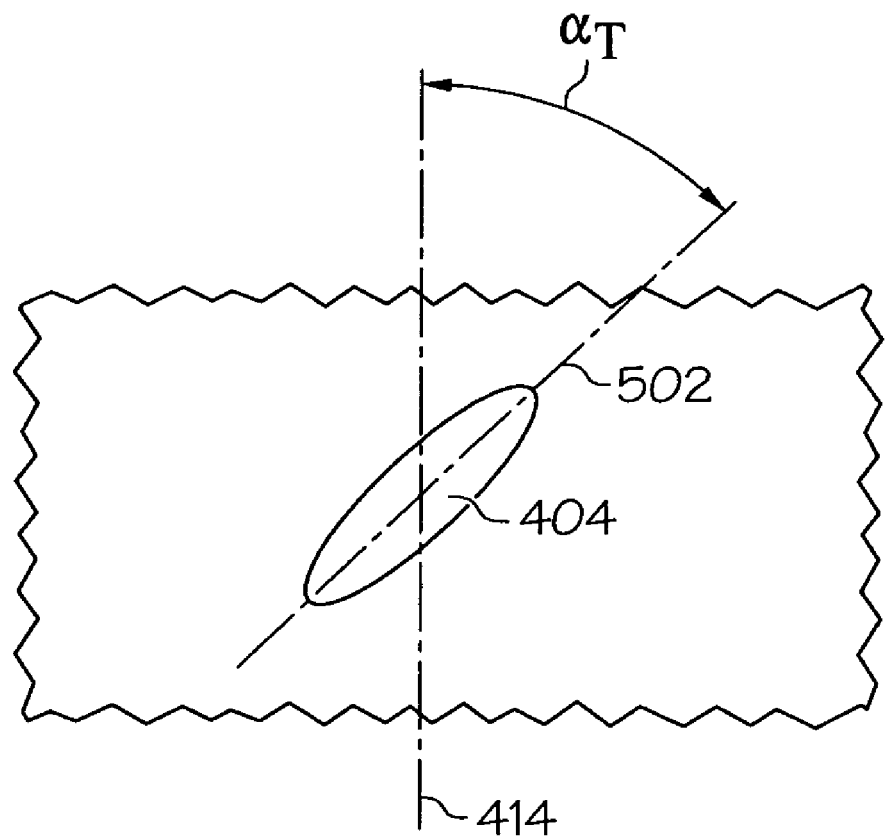
FIG. 5 is a close-up view of the exemplary combustor liner shown in FIG. 4, depicting the configuration of an exemplary effusion cooling hole that extends therethrough.

In addition to the dilution openings 234, the inner 202 and outer 204 liners include a plurality of effusion cooling holes. The effusion cooling holes, which are not visible in FIGS. 2 and 3, allow additional dilution air to flow into the combustion chamber 228. Moreover, as was previously mentioned, air flow through the effusion cooling holes cools the inner 202 and outer 204 liners via convective heat transfer, and by generating a cooling film on the inner surfaces 208, 218 of the inner and outer liners 202, 204. With reference now to FIGS. 4 and 5, a more detailed description of the configuration of the effusion cooling holes will be provided.

As is shown most clearly in FIG. 4, which is a top view of a portion of the combustor outer liner 204 between its upstream 224 and downstream 226 ends, the outer liner 204 includes a plurality of effusion cooling hole sets 402. It will be appreciated that the number of effusion cooling hole sets 402 may vary, and may be selected to meet needed or desired cooling requirements. However, in the preferred embodiment, an effusion cooling hole set 402 is disposed upstream of each major row of combustor orifices, such as the dilution openings 234, and an effusion cooling hole set 402 is disposed downstream of each major row of combustor orifices. Thus, in the depicted embodiment, the outer liner 204 includes two effusion cooling hole sets 402-1, 402-2. It will be appreciated, however, that this is merely exemplary of the depicted embodiment, and that the outer liner 204 could be implemented with more than two effusion cooling hole sets 402 if needed or desired. For example, if the combustor 124 included more than a single circumferential row of dilution openings 234, then the outer liner 204 would preferably be implemented with more than two effusion cooling hole sets 402. More specifically, if the combustor 124 included both a row of primary dilution openings 234 and a row of secondary dilution openings 234, then the outer liner 204 would preferably be implemented with at least three effusion cooling hole sets 402. Moreover, before proceeding further, it is noted that although only the outer liner 204 is depicted in FIGS. 4 and 5, it will be appreciated that the inner liner 202 is preferably configured to include similarly configured effusion cooling holes sets 402.

No matter the specific number of effusion cooling hole sets 402 that are included in the inner 202 and outer 204 liners, each effusion cooling hole set 402 includes a plurality of effusion cooling holes 404 that extend through the outer liner 204 between its inner 218 and outer 222 surfaces. The effusion cooling holes 404 in each effusion cooling hole set 402 typically have a diameter of between about 0.010 inches and about 0.030 inches, and are configured in a plurality of rows. In particular, each effusion cooling hole set 402 includes one or more initial rows 406 of effusion cooling holes 404, one or more final rows 408 of effusion cooling holes 404 disposed downstream of the one or more initial rows 406, and a plurality of interposed rows 412 of effusion cooling holes 404 disposed between the initial 406 and final 408 rows. It will be appreciated that the initial rows 406 are disposed at the upstream-most extent of each effusion cooling hole set 402, and the final rows 408 are concomitantly disposed at the downstream-most extent of each effusion cooling hole set 402.

It will additionally be appreciated that the total number of rows 406, 408, 412 in an effusion cooling hole set 402 may vary, and that the number of initial rows 406, final rows 408, and interposed rows 412 within an effusion cooling hole set 402 may vary. For example, in the depicted embodiment, the first effusion cooling hole set 402-1 includes a total of fourteen rows, which are implemented as one initial row 406, three final rows 408, and ten interposed rows 412. The second effusion cooling hole set 402-2 also includes a total of fourteen rows; however, the second set 402-2 is implemented with four initial rows 406, three final rows 408, and seven interposed rows 412.

No matter the specific row that an effusion cooling hole 404 is in, each hole 404 is disposed at a tangential angle ($\alpha_T$) relative to an axial line 414 that extends between the outer liner upstream 224 and downstream 226 ends. More specifically, and as shown more clearly in FIG. 5, each effusion cooling hole 404 is disposed such that a centerline 502 thereof forms an angle ($\alpha_T$) relative to the axial line 414.

Returning now to FIG. 4, it is seen that the tangential angle ($\alpha_T$) of the effusion cooling holes 404 in each set 402, gradually transitions from a substantially transverse tangential angle ($\alpha_T$) in each initial row 406 to a substantially axial tangential angle ($\alpha_T$) in each final row 408. More specifically, each effusion cooling hole 404 in an initial row 406 is preferably disposed at a tangential angle ($\alpha_T$) of between about 70-degrees and about 90-degrees, and most preferably at about 90-degrees, and each effusion cooling hole 404 in a final row 408 is preferably disposed at a tangential angle ($\alpha_T$) of between about zero-degrees and about 20-degrees, and most preferably at about zero-degrees. Concomitantly, the effusion cooling holes 404 in each of the interposed rows 412 are preferably disposed at a tangential angle ($\alpha_T$) that is less than the tangential angle ($\alpha_T$) of the effusion cooling holes 404 each initial row 406 and greater than the tangential angle ($\alpha_T$) of the effusion cooling holes 404 in each final row 408. Preferably, the tangential angle ($\alpha_T$) of the effusion cooling holes 404 in each of the interposed rows 412 has a multiplicity of values that vary in a graduated manner as the rows 412 progress downstream.

Figure 6:
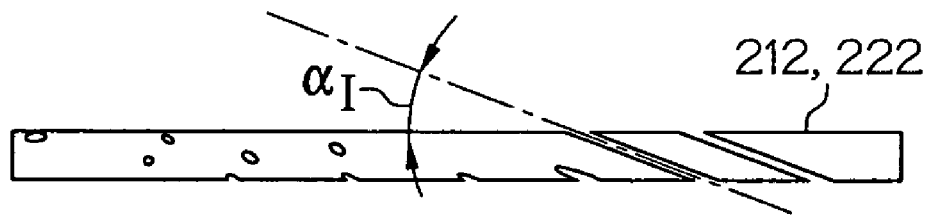
FIG. 6 is a cross section view of a portion of the exemplary combustor liner shown in FIG. 4, and which is taken along line 6-6 in FIG. 4.

In addition to being disposed at a tangential angle ($\alpha_T$), it will be appreciated that the effusion cooling holes 404 are also preferably disposed at an inward angle ($\alpha_I$). More specifically, and as shown more clearly in FIG. 6, each effusion cooling hole 404 extends through the liners 202, 204 at an acute angle relative to the liner outer surface 212, 222. Although the inward angle ($\alpha_I$) may vary, in a particular preferred embodiment the inward angle ($\alpha_I$) is between about 10-degrees and about 30-degrees.

With the effusion cooling hole 404 configuration described herein, the substantially transversely disposed effusion cooling holes 404 in each of the initial rows 406 serve to establish a cooling film on the liner inner surfaces 208, 218. The transition of the effusion cooling holes 404 from the substantially transverse tangential angle ($\alpha_T$) to the substantially axial tangential angle ($\alpha_T$) encourages cooling air flow in the downstream direction, which provides continued effective cooling of the liner inner surfaces 208, 218 while mitigating the swirl component of the upstream effusion cooling holes 404. Moreover, because another effusion cooling hole set 402 is disposed downstream of each circumferential row of major combustor orifices, such as the dilution openings 234, the repeated transition from a substantially transverse tangential angle ($\alpha_T$) to a substantially axial tangential angle ($\alpha_T$) maintains the cooling film downstream of these major combustor orifices, and helps increase overall combustor 124 cooling efficiency.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine combustor, comprising:
    an inner liner and having an inner surface, an outer surface, an upstream end, a downstream end, the inner liner extending in an axial direction between the upstream and downstream ends;
    an outer liner having an inner surface, an outer surface, an upstream end, and a downstream end, the outer liner extending in the axial direction between the upstream and downstream ends and spaced apart from, and at least partially surrounding, the inner liner;
    a dome assembly coupled between the upstream ends of the inner and outer annular liners to define a combustion chamber between the inner liner outer surface and the outer liner inner surface; and
    two or more sets of effusion cooling holes extending through the outer liner between the outer liner outer and inner surfaces, each set of effusion cooling holes including one or more initial rows of effusion cooling holes, one or more final rows of effusion cooling holes disposed downstream of the one or more initial rows, and a plurality of interposed rows of effusion cooling holes disposed between the initial and final rows, wherein:
        each effusion cooling hole in the one or more initial rows is disposed at a tangential angle of between about 70° and about 90° relative to the axial direction,
        each effusion cooling hole in the one or more final rows is disposed at a tangential angle of between about 0° and about 20° relative to the axial direction, and
        each effusion cooling hole in each of the interposed rows disposed at a tangential angle, relative to the axial direction, that is less than the tangential angle of the effusion cooling holes in the one or more initial rows and greater than the tangential angle of the effusion cooling holes in the one or more final rows.

2. The combustor of claim 1, further comprising:
    one or more rows of dilution openings extending through the outer liner and disposed between each set of effusion cooling holes.

3. The combustor of claim 2, wherein the one or more rows of dilution openings includes:
    a row of primary dilution openings; and
    a row of secondary dilution openings disposed adjacent the primary dilution openings.

4. The combustor of claim 1, wherein each effusion cooling hole in each set of effusion cooling holes has a diameter between about 0.010-inches and 0.030-inches.

5. The combustor of claim 1, wherein each effusion cooling hole in each set of effusion cooling holes extends through the outer liner at an acute angle relative to the outer liner outer surface.

6. The combustor of claim 1, further comprising:
    two or more sets of effusion cooling holes extending through the inner liner, each set of effusion cooling holes including one or more initial rows of effusion cooling holes, one or more final rows of effusion cooling holes disposed downstream of the one or more initial rows, and a plurality of interposed rows of effusion cooling holes disposed between the initial and final rows, wherein:
        each effusion cooling hole in the one or more initial rows is disposed at a tangential angle of between about 70° and about 90° relative to the axial direction,
        each effusion cooling hole in the one or more final rows is disposed at a tangential angle of between about 0° and about 20° relative to the axial direction, and
        each effusion cooling hole in each of the interposed rows disposed at a tangential angle, relative to the axial direction, that is less than the tangential angle of the effusion cooling holes in the one or more initial rows and greater than the tangential angle of the effusion cooling holes in the one or more final rows.

7. The combustor of claim 6, further comprising:
    one or more rows of dilution openings extending through the inner liner and disposed between each set of effusion cooling holes in the inner liner; and
    one or more rows of dilution openings extending through the outer liner and disposed between each set of effusion cooling holes in the outer liner.

8. The combustor of claim 7, wherein the one or more rows of dilution openings includes:
    a row of primary dilution openings; and
    a row of secondary dilution openings disposed adjacent the primary dilution openings.

9. The combustor of claim 6, wherein each effusion cooling hole in each set of effusion cooling holes has a diameter between about 0.010-inches and 0.030-inches.

10. The combustor of claim 6, wherein:
    each effusion cooling hole in each set of effusion cooling holes in the outer liner extends through the outer liner at an acute angle relative to the outer liner outer surface; and
    each effusion cooling hole in each set of effusion cooling holes in the inner liner extends through the inner liner at an acute angle relative to the inner liner outer surface.

11. A gas turbine engine combustor, comprising:
    an inner liner and having an inner surface, an outer surface, an upstream end, a downstream end, the inner liner extending in an axial direction between the upstream and downstream ends;
    an outer liner extending in the axial direction and having an inner surface, an outer surface, an upstream end, and a downstream end, the outer liner spaced apart from, and at least partially surrounding, the inner liner;
    a dome assembly coupled between the upstream ends of the inner and outer annular liners to define a combustion chamber therebetween;
    two or more sets of effusion cooling holes extending through the inner liner between the inner liner outer and inner surfaces; and
    two or more sets of effusion cooling holes extending through the outer liner between the outer liner outer and inner surfaces,
    wherein each set of effusion cooling holes in both the inner and outer liners includes one or more initial rows of effusion cooling holes, one or more final rows of effusion cooling holes disposed downstream of the one or more initial rows, and a plurality of interposed rows of effusion cooling holes disposed between the initial and final rows, and
    wherein:

each effusion cooling hole in the one or more initial rows is disposed at a tangential angle of between about 70° and about 90° relative to the axial direction, each effusion cooling hole in the one or more final rows is disposed at a tangential angle of between about 0° and about 20° relative to the axial direction, and each effusion cooling hole in each of the interposed rows disposed at a tangential angle, relative to the axial direction, that is less than the tangential angle of the effusion cooling holes in the one or more initial rows and greater than the tangential angle of the effusion cooling holes in the one or more final rows.

12. The combustor of claim 11, further comprising:

one or more rows of dilution openings extending through the inner liner and disposed between each set of effusion cooling holes disposed therein; and one or more rows of dilution openings extending through the outer liner and disposed between each set of effusion cooling holes disposed therein.

13. The combustor of claim 12, wherein the one or more rows of dilution openings includes:

a row of primary dilution openings; and a row of secondary dilution openings disposed adjacent the primary dilution openings.

14. The combustor of claim 11, wherein each effusion cooling hole in each set of effusion cooling holes has a diameter between about 0.010-inches and 0.030-inches.

15. The combustor of claim 11, wherein:

each effusion cooling hole in each set of effusion cooling holes in the outer liner extends through the outer liner at an acute angle relative to the outer liner outer surface; and each effusion cooling hole in each set of effusion cooling holes in the inner liner extends through the inner liner at an acute angle relative to the inner liner outer surface.

16. A gas turbine engine, comprising:

a compressor, a combustor, and a turbine disposed in flow series with one another, the combustor including:

an inner liner and having an inner surface, an outer surface, an upstream end, and a downstream end, the inner liner extending in an axial direction between the upstream and downstream ends;

an outer liner extending in the axial direction and having an inner surface, an outer surface, an upstream end, and a downstream end, the outer liner spaced apart from, and at least partially surrounding, the inner liner;

a dome assembly coupled between the upstream ends of the inner and outer annular liners to define a combustion chamber therebetween; and two or more sets of effusion cooling holes extending through the outer liner between the outer liner outer and inner surfaces, each set of effusion cooling holes including one or more initial rows of effusion cooling holes, one or more final rows of effusion cooling holes disposed downstream of the one or more initial rows, and a plurality of interposed rows of effusion cooling holes disposed between the initial and final rows, wherein:

each effusion cooling hole in the one or more initial rows is disposed at a tangential angle of between about 70° and about 90° relative to the axial direction, each effusion cooling hole in the one or more final rows is disposed at a tangential angle of between about 0° and about 20° relative to the axial direction, and each effusion cooling hole in each of the interposed rows disposed at a tangential angle, relative to the axial direction, that is less than the tangential angle of the effusion cooling holes in the one or more initial rows and greater than the tangential angle of the effusion cooling holes in the one or more final rows.

17. The engine of claim 16, further comprising:

two or more sets of effusion cooling holes extending through the inner liner, each set of effusion cooling holes including one or more initial rows of effusion cooling holes, one or more final rows of effusion cooling holes disposed downstream of the one or more initial rows, and a plurality of interposed rows of effusion cooling holes disposed between the initial and final rows, wherein:

each effusion cooling hole in the one or more initial rows is disposed at a tangential angle of between about 70° and about 90° relative to the axial direction, each effusion cooling hole in the one or more final rows is disposed at a tangential angle of between about 0° and about 20° relative to the axial direction, and each effusion cooling hole in each of the interposed rows disposed at a tangential angle, relative to the axial direction, that is less than the tangential angle of the effusion cooling holes in the one or more initial rows and greater than the tangential angle of the effusion cooling holes in the one or more final rows.

18. The combustor of claim 17, further comprising:

one or more rows of dilution openings extending through the inner liner and disposed between each set of effusion cooling holes in the inner liner; and one or more rows of dilution openings extending through the outer liner and disposed between each set of effusion cooling holes in the outer liner.

19. The combustor of claim 18, wherein the one or more rows of dilution openings includes:

a row of primary dilution openings; and a row of secondary dilution openings disposed downstream of the primary dilution openings.

20. The combustor of claim 16, wherein:

each effusion cooling hole in each set of effusion cooling holes in the outer liner is disposed at an inward angle of between about 10° and about 30° relative to the outer liner inner surface; and each effusion cooling hole in each set of effusion cooling holes in the inner liner is disposed at an inward angle of between about 10° and about 30° relative to the inner liner inner surface.

* * * * *